US008368810B2

(12) United States Patent
Gong et al.

(10) Patent No.: US 8,368,810 B2
(45) Date of Patent: Feb. 5, 2013

(54) VIDEO PROCESSING APPARATUS AND RELATED METHOD FOR DE-INTERLACING

(75) Inventors: Jin-Sheng Gong, Hsinchu (TW); Chun-Hsing Hsieh, Hsin-Chu (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 458 days.

(21) Appl. No.: 12/690,903

(22) Filed: Jan. 20, 2010

(65) Prior Publication Data

US 2010/0188570 A1 Jul. 29, 2010

(30) Foreign Application Priority Data

Jan. 23, 2009 (TW) .............................. 98102916 A

(51) Int. Cl.
*H04N 7/01* (2006.01)
*H04N 11/20* (2006.01)
(52) U.S. Cl. ........................................ 348/443; 348/448
(58) Field of Classification Search ........... 348/441–459
See application file for complete search history.

(56) References Cited

U.S. PATENT DOCUMENTS

| | | | |
|---|---|---|---|
| 5,835,150 A * | 11/1998 | Choi | 348/441 |
| 6,111,610 A | 8/2000 | Faroudja | |
| 6,141,055 A | 10/2000 | Li | |
| 6,222,589 B1 | 4/2001 | Faroudja | |
| 6,469,744 B1 | 10/2002 | Pearlstein | |
| 6,549,240 B1 | 4/2003 | Reitmeier | |
| 6,774,950 B1 | 8/2004 | Jiang | |
| 6,784,921 B2 | 8/2004 | Lim | |
| 7,158,186 B2 | 1/2007 | Selby | |
| 7,187,417 B2 | 3/2007 | Honda | |
| 7,508,449 B1 | 3/2009 | Greenberg | |
| 7,623,183 B2 | 11/2009 | Hsu | |
| 7,738,045 B2 * | 6/2010 | Doswald et al. | 348/701 |
| 2004/0239803 A1 | 12/2004 | Selby | |
| 2005/0024534 A1 | 2/2005 | Honda | |
| 2005/0030426 A1 * | 2/2005 | Chang et al. | 348/558 |
| 2007/0030384 A1 | 2/2007 | Wredenhagen | |
| 2007/0035660 A1 | 2/2007 | Gong | |
| 2008/0055318 A1 | 3/2008 | Glen | |
| 2008/0151108 A1 * | 6/2008 | Doswald | 348/456 |

* cited by examiner

*Primary Examiner* — Jefferey Harold
*Assistant Examiner* — Michael Teitelbaum
(74) *Attorney, Agent, or Firm* — Winston Hsu; Scott Margo

(57) ABSTRACT

A video processing apparatus for de-interlacing includes a video decoder and a de-interlacing circuit. The video decoder decodes a video data stream to generate an interlaced video signal and transmits a first interlaced control signal. The de-interlacing circuit is coupled to the video decoder, and includes a detecting unit and an interlacing to progressive converting unit. The detecting unit generates a second interlaced control signal according to the interlaced video signal and the first interlaced control signal. The interlacing to progressive converting unit is coupled to the detecting unit for receiving the interlaced video signal as well as the second interlaced control signal and for converting the interlaced video signal into a first progressive video signal according to the second interlaced control signal.

6 Claims, 4 Drawing Sheets

(2A)

(2B)

(3A)

(3B)

VIDEO PROCESSING APPARATUS AND RELATED METHOD FOR DE-INTERLACING

BACKGROUND OF THE INVENTION

1. Field of the Invention

The present invention relates to a de-interlacing technology, and more particularly, to a video processing apparatus for controlling a 3:2/2:2 pull-down detector of a de-interlacing circuit by directly sending out corresponding signals via a video decoder so that poor images resulted from erroneous detections of the 3:2/2:2 detector can be avoided.

2. Description of the Prior Art

Movies are typically made and played at a speed of 24 Hz (i.e., 24 frames per second). If a movie needs to be played by a video playback device, such as a television or a digital versatile disc (DVD) player, the frames of the movie must be converted into video data conforming to National Television System Committee (NTSC) format or Phase Alternating Line (PAL) format.

The 3:2 pull-down detection and 2:2 pull-down detection are typical processing approaches to the video processing mentioned above. Generally speaking, the 3:2/2:2 pull-down detection is disposed in a de-interlacing circuit. However, regardless of how good the detection algorithm is, erroneous detections may occur when dealing with signals with larger noises or some special codes. Hence, it may result in a poor display performance or even make a problem that the frames outputted by the 3:2/2:2 pull-down detection move around or unsmooth more serious.

SUMMARY OF THE INVENTION

It is one of the objectives of the claimed invention to provide a video processing apparatus for de-interlacing and a related method to solve the abovementioned problems.

According to an exemplary embodiment of the present invention, a video processing apparatus for de-interlacing is provided. The video processing apparatus includes a video decoder and a de-interlacing circuit. The video decoder decodes a video data stream to generate an interlaced video signal and transmits a first interlaced control signal. The de-interlacing circuit is coupled to the video decoder and includes a detecting unit as well as an interlacing to progressive converting unit. The detecting unit generates a second interlaced control signal according to the interlaced video signal as well as the first interlaced control signal. The interlacing to progressive converting unit is coupled to the detecting unit, and it receives the interlaced video signal as well as the second interlaced control signal and converts the interlaced video signal into a first progressive video signal. The detecting unit is a 3:2 pull-down detector or a 2:2 pull-down detector.

According to another exemplary embodiment of the present invention, a video processing apparatus for de-interlacing is provided. The video processing apparatus includes a video decoder, a de-interlacing circuit, and a frame rate converting circuit. The video decoder decodes a video data stream to generate an interlaced video signal and transmits a first interlaced control signal. The de-interlacing circuit is coupled to the video decoder, and it receives the interlaced video signal and converts the interlaced video signal into a first progressive video signal. The frame rate converting circuit is coupled to the de-interlacing circuit and the video decoder, and it adjusts a frame rate of the first progressive video signal to generate a second progressive video signal according to the first interlaced control signal.

According to another exemplary embodiment of the present invention, a video processing method for de-interlacing is provided. The method includes the steps of: decoding a video data stream to generate an interlaced video signal; transmitting a first interlaced control signal; generating a second interlaced control signal according to the interlaced video signal as well as the first interlaced control signal; and receiving the interlaced video signal as well as the second interlaced control signal, and converting the interlaced video signal into a first progressive video signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
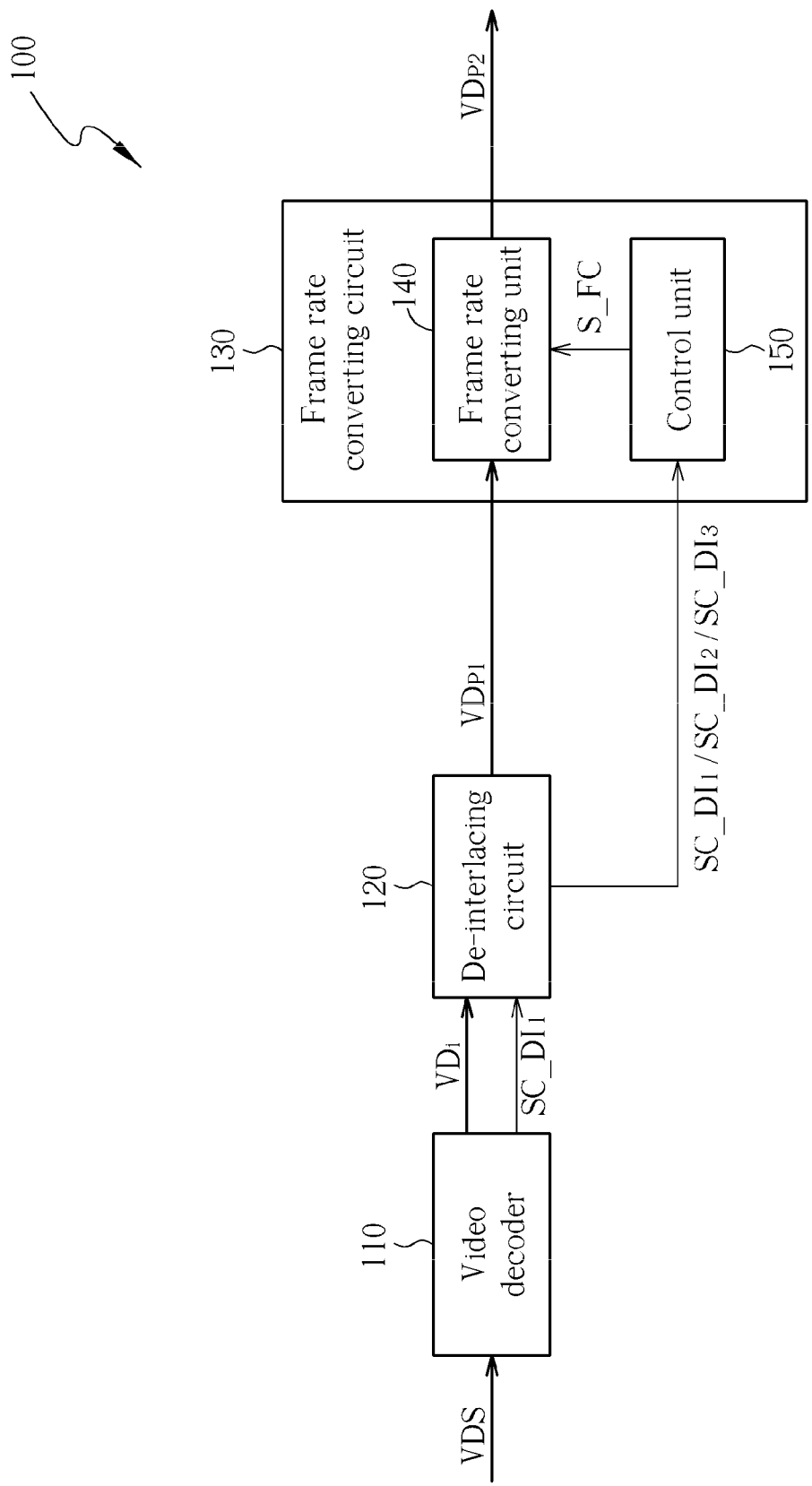
FIG. 1 is a diagram of a video processing apparatus for de-interlacing according to an embodiment of the present invention.

Please refer to FIG. 1. FIG. 1 is a diagram of a video processing apparatus 100 for de-interlacing according to an embodiment of the present invention. As shown in FIG. 1, the video processing apparatus 100 includes, but is not limited to, a video decoder 110, a de-interlacing circuit 120, and a frame rate converting circuit 130. The video decoder 110 decodes a video data stream VDS to generate an interlaced video signal VDi and transmits a first interlaced control signal $SC\_DI_1$. The de-interlacing circuit 120 is coupled to the video decoder 110. The de-interlacing circuit 120 receives the interlaced video signal VDi as well as the first interlaced control signal $SC\_DI_1$, generates a second interlaced control signal $SC\_DI_2$ according to the interlaced video signal VDi as well as the first interlaced control signal $SC\_DI_1$, and finally converts the interlaced video signal VDi into a first progressive video signal $VD_{P1}$. The frame rate converting circuit 130 is coupled to the de-interlacing circuit 120, and it adjusts a frame rate of the first progressive video signal $VD_{P1}$ to generate a second progressive video signal $VD_{P2}$ according to one of the following signals—the first interlaced control signal $SC\_DI_1$, the second interlaced control signal $SC\_DI_2$, and a third interlaced control signal $SC\_DI_3$.

In this embodiment, the frame rate converting circuit 130 includes a frame rate converting unit 140 and a control unit 150. The control unit 150 generates a frame control signal S_FC to the frame rate converting unit 140 according to one of the following signals—the first interlaced control signal $SC\_DI_1$, the second interlaced control signal $SC\_DI_2$, and the third interlaced control signal $SC\_DI_3$. The frame rate converting unit 140 then adjusts the frame rate of the first progressive video signal $VD_{P1}$ to generate the second progressive video signal $VD_{P2}$ by reference to the frame control signal S_FC. The operations of the control unit 150 and the frame rate converting unit 140 are already well-known to those skilled in the art, and further description is omitted here for brevity. The detailed circuit architecture and operations of the de-interlacing circuit 120 will be explained in the following embodiments.

The aforementioned video decoder can be a MPEG decoder or a digital TV decoder, but this should not be considered as a limitation of the present invention and other types of video decoders can be adopted.

Figure 2:
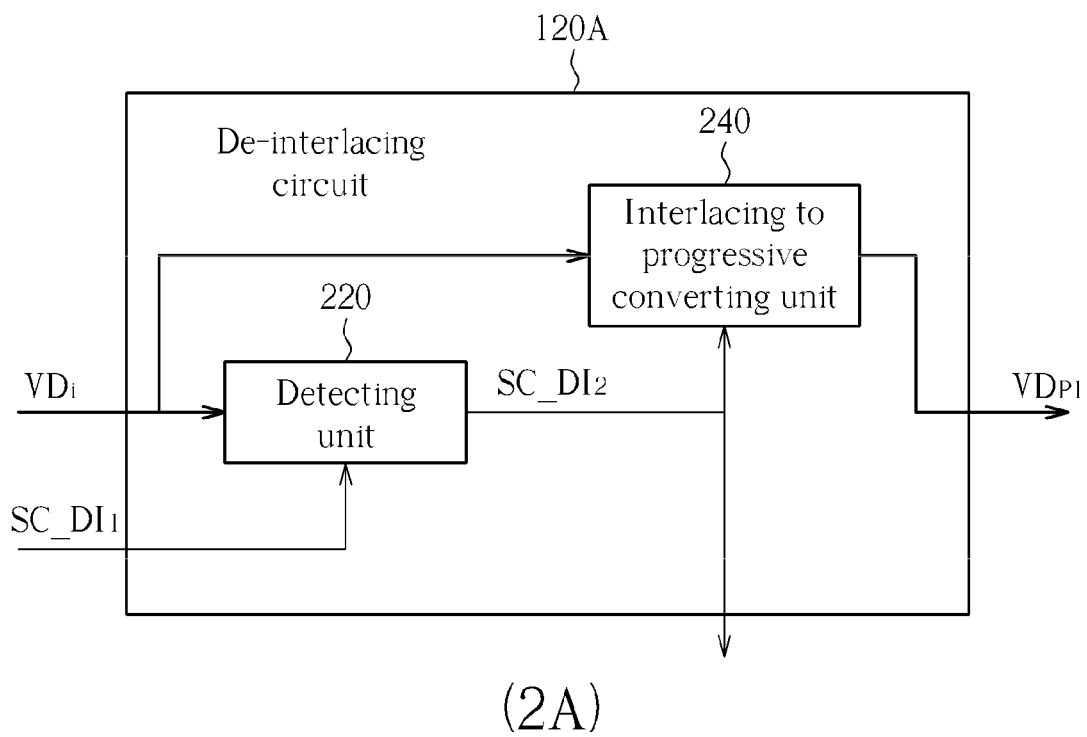
FIG. 2 (including 2A and 2B) is a diagram showing an exemplary embodiment of the de-interlacing circuit shown in FIG. 1.
Figure 2:
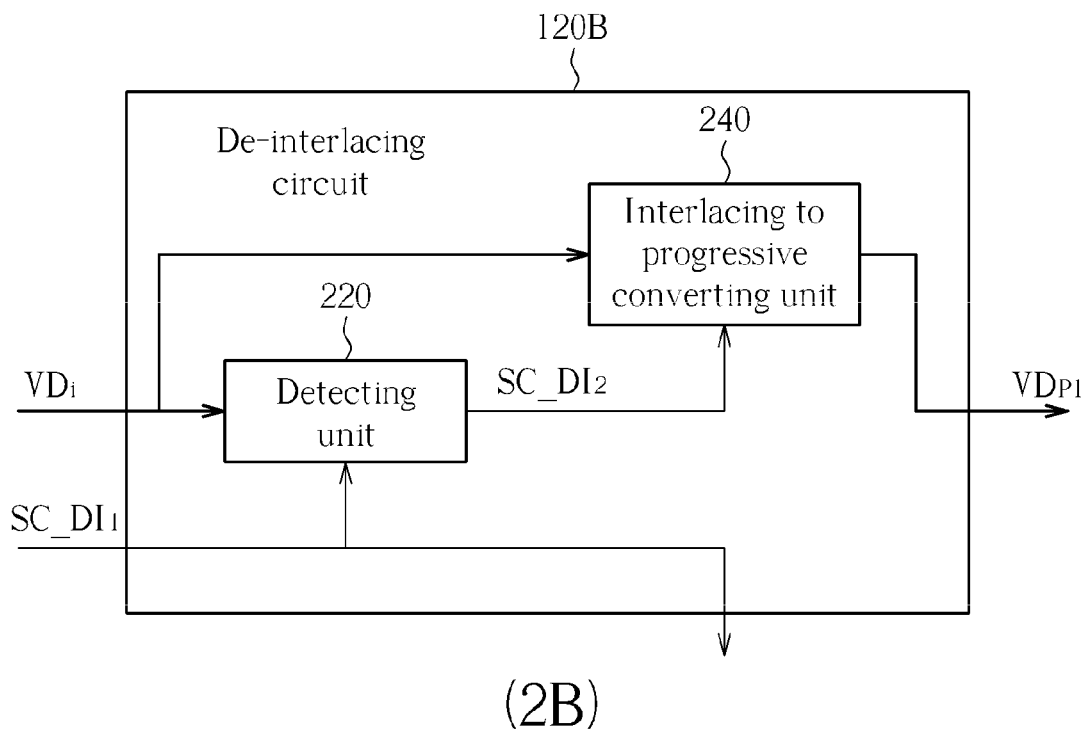

Please refer to FIG. 2. FIG. 2 (including 2A and 2B) is a diagram showing an exemplary embodiment of the de-interlacing circuit 120 shown in FIG. 1. As shown in 2A, the de-interlacing circuit 120A includes a detecting unit 220 and a interlacing to progressive converting unit 240. The detecting unit 220 generates the second interlaced control signal $SC\_DI_2$ according to the interlaced video signal VDi as well as the first interlaced control signal $SC\_DI_1$. The interlacing to progressive converting unit 240 is coupled to the detecting unit 220. The interlacing to progressive converting unit 240 receives the interlaced video signal VDi as well as the second interlaced control signal $SC\_DI_2$, and then converts the interlaced video signal VDi into the first progressive video signal $VD_{P1}$ according to the second interlaced control signal $SC\_DI_2$. Be noted that, in 2A, the second interlaced control signal $SC\_DI_2$ is outputted to the frame rate converting circuit 130 (not shown) for the follow-up frame rate conversions by the de-interlacing circuit 120A. In 2B, the architecture of the de-interlacing circuit 120B is similar to that of the de-interlacing circuit 120A shown in 2A, and the difference between them is that the first interlaced control signal $SC\_DI_1$ is outputted to the frame rate converting circuit 130 (not shown) for the follow-up frame rate conversions by the de-interlacing circuit 120B.

The aforementioned detecting unit 220 can be a 3:2 pull-down detector or a 2:2 pull-down detector, but is not limited to this only and can be detectors of other types. Please note that the aforementioned first interlaced control signal $SC\_DI_1$ is information used for indicating the de-interlacing circuit 120 how to perform field-merge operations. For example, the first interlaced control signal $SC\_DI_1$ can include a merge enable signal, a merge forward signal and a merge backward signal. The merge enable signal is used for determining to directly perform the field-merge operations without the judgment of the detecting unit 220, while the merging direction is decided based on the merge forward signal as well as the merge backward signal. In addition, the second interlaced control signal $SC\_DI_2$ is generated by reference to the interlaced video signal VDi together with the first interlaced control signal $SC\_DI_1$, wherein the second interlaced control signal $SC\_DI_2$ is also used for indicating the de-interlacing circuit 120 how to perform the field-merge operations. In one word, the first interlaced control signal $SC\_DI_1$ is the information directly sent out by the video decoder 110 for indicating the de-interlacing circuit 120 how to perform the field-merge operations, while the second interlaced control signal $SC\_DI_2$ is generated according to the interlaced video signal VDi together with the first interlaced control signal $SC\_DI_1$ by the detecting unit 220. Furthermore, each of the above-mentioned signals can be implemented by software or hardware.

Figure 3:
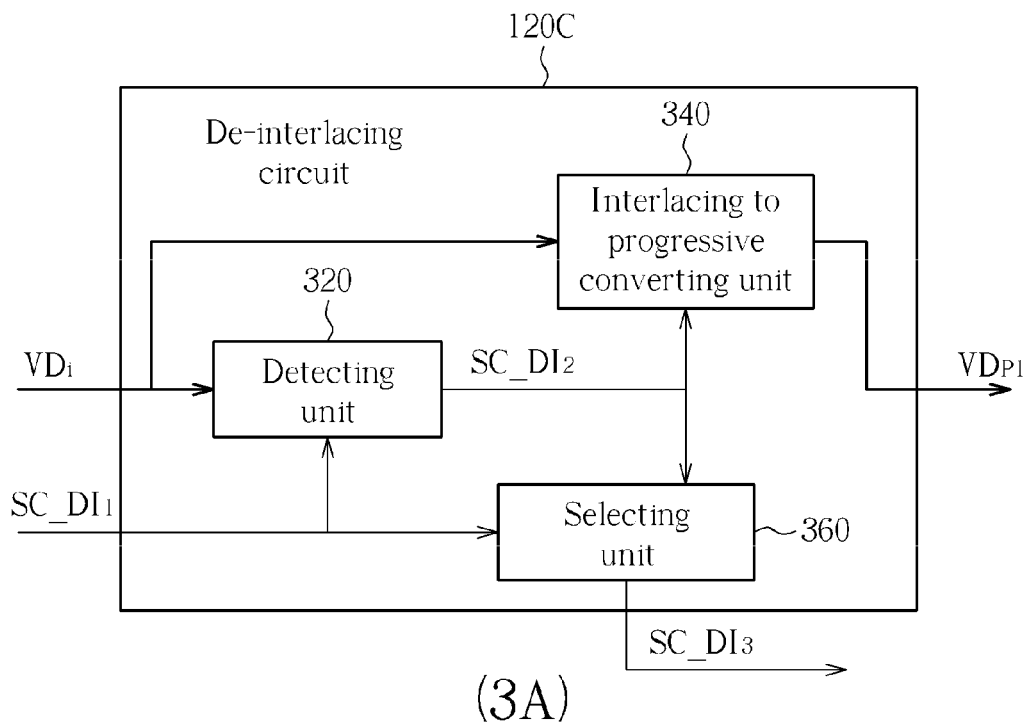
FIG. 3 (including 3A and 3B) is a diagram showing another exemplary embodiment of the de-interlacing circuit shown in FIG. 1.
Figure 3:
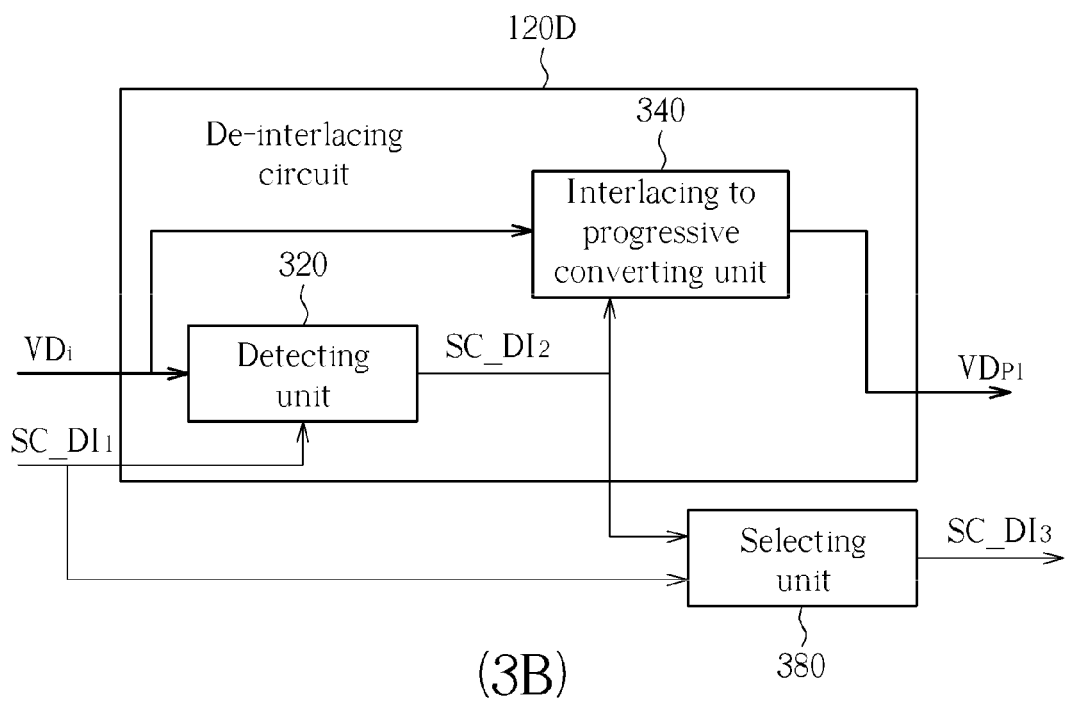

Please refer to FIG. 3. FIG. 3 (including 3A and 3B) is a diagram showing another exemplary embodiment of the de-interlacing circuit 120 shown in FIG. 1. As shown in 3A, the de-interlacing circuit 120C includes a detecting unit 320, a interlacing to progressive unit 340 and a selecting unit 360. The selecting unit 360 is coupled to the video decoder 110 (not shown) and the detecting unit 320. The selecting unit 360 selects one signal from the first interlaced control signal $SC\_DI_1$ and the second interlaced control signal $SC\_DI_2$ as a third interlaced control signal $SC\_DI_3$, and then outputs the third interlaced control signal $SC\_DI_3$ to the frame rate converting circuit 130 (not shown) for the follow-up frame rate conversions. In 3B, the architecture of the de-interlacing circuit 120D is similar to that of the de-interlacing circuit 120C shown in 3A, and the difference between them is that the selecting unit 380 shown in 3B is disposed outside the de-interlacing circuit 120D while the selecting unit 360 is disposed inside the de-interlacing circuit 120C.

These embodiments above are presented merely for describing applications of the present invention, and in no way should be considered to be limitations of the scope of the present invention. It will be obvious to those skilled in the art that various modifications of the de-interlacing circuit may be made without departing from the spirit of the present invention. Moreover, the de-interlacing video signal VDi can includes interlaced scanning frames with 48 Hz, 60 Hz or 72 Hz, where they can respectively be represented by 48i, 60i and 72i. But those skilled in the art should know that this is not a limitation of the present invention, and the interlaced video signal VDi can includes interlaced scanning frames with other frequencies.

In the following descriptions, several examples are cited for illustrating the detailed operations of the video processing apparatus 100.

In a first case, the interlaced video signal VDi sent out by the video decoder 110 belongs to a 60i interlaced scanning frame. The de-interlacing circuit 120 receives the 60i interlaced scanning frame, and converts the 60i interlaced scanning frame into a 60p progressive scanning frame by reference to the first interlaced control signal $SC\_DI_1$. After that, the frame rate converting circuit 130 adjusts the frame rate of the 60p progressive scanning frame to generate a 48p progressive scanning frame or a 72P progressive scanning frame (i.e. the second progressive video signal $VD_{P2}$) according to one of the following signals—the first interlaced control signal $SC\_DI_1$, the second interlaced control signal $SC\_DI_2$, and the third interlaced control signal $SC\_DI_3$. Since 48 and 72 are integral multiples of 24, a problem of rough movements of a full frame with 24 Hz can be avoided if this full frame with 24 Hz is generated by merging the 48p/72p progressive scanning frames.

In a second case, the interlaced video signal VDi sent out by the video decoder 110 belongs to a 48i interlaced scanning frame or a 72i interlaced scanning frame. At this time, the de-interlacing circuit 120 receives the 48i/72i interlaced scanning frame, and converts the 48i/72i interlaced scanning frame into a 48p/72p progressive scanning frame by reference to the first interlaced control signal $SC\_DI_1$. Herein the frame rate conversion of the frame rate converting circuit 130 is not required, and the 48p/72p progressive scanning frame can be directly outputted. Since 48 and 72 are integral multiples of 24, a problem of rough movements of a full frame with 24 Hz can be avoided if this full frame with 24 Hz is generated by merging the 48p/72p progressive scanning frames.

Figure 4:
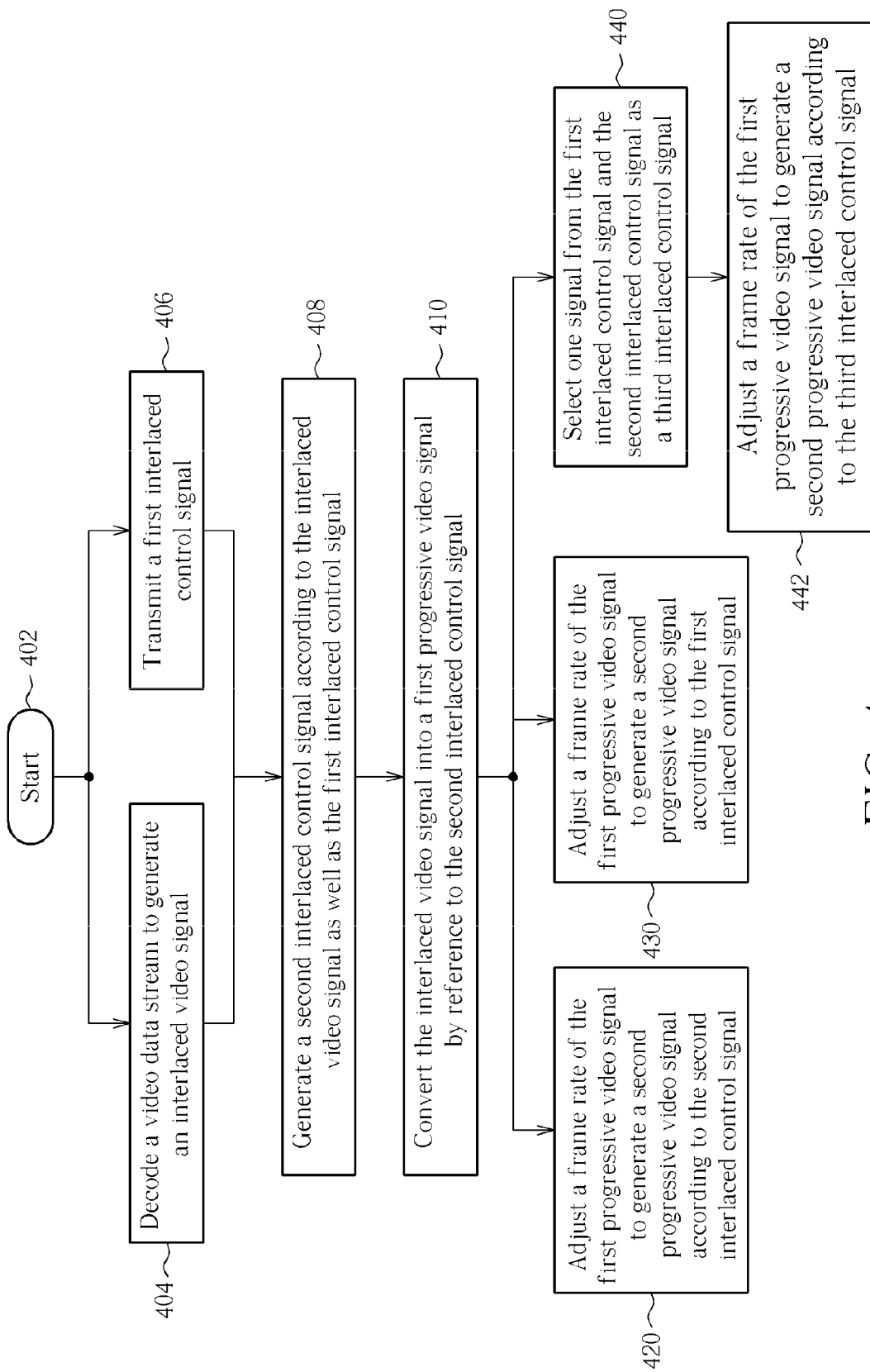
FIG. 4 is a flowchart illustrating a video processing method for de-interlacing according to an exemplary embodiment of the present invention.

Please refer to FIG. 4. FIG. 4 is a flowchart illustrating a video processing method for de-interlacing according to an exemplary embodiment of the present invention. Please note that the following steps are not limited to be performed according to the exact sequence shown in FIG. 4 if a substantially identical result can be obtained. The method includes, but is not limited to, the following steps:

Step 402: Start.
Step 404: Decode a video data stream to generate an interlaced video signal.
Step 406: Transmit a first interlaced control signal.

Step 408: Generate a second interlaced control signal according to the interlaced video signal as well as the first interlaced control signal.

Step 410: Receive the interlaced video signal as well as the second interlaced control signal, and convert the interlaced video signal into a first progressive video signal by reference to the second interlaced control signal.

Step 420: Adjust a frame rate of the first progressive video signal to generate a second progressive video signal according to the second interlaced control signal.

Step 430: Adjust a frame rate of the first progressive video signal to generate a second progressive video signal according to the first interlaced control signal.

Step 440: Select one signal from the first interlaced control signal and the second interlaced control signal as a third interlaced control signal.

Step 442: Adjust a frame rate of the first progressive video signal to generate a second progressive video signal according to the third interlaced control signal.

How each element operates can be known by collocating the steps shown in FIG. 4 and the elements shown in FIG. 1~FIG. 3, and further description is omitted here for brevity. Be noted that the steps 404~406 are executed by the video decoder 110, the steps 408~410 are executed by the de-interlacing circuit (e.g. 120 or 120A~120D), the steps 420, 430 and 442 are executed by the frame rate converting circuit 130, and the step 440 is executed by the selecting unit 360 or 380.

Please note that, the steps of the abovementioned flowchart are merely an exemplary embodiment of the present invention, and in no way should be considered to be limitations of the scope of the present invention. The method can include other intermediate steps or several steps can be merged into a single step without departing from the spirit of the present invention. Those skilled in the art should observe that various modifications of the method may be made.

The abovementioned embodiments are presented merely for describing the present invention, and in no way should be considered to be limitations of the scope of the present invention. In summary, the present invention provides a video processing apparatus for de-interlacing and a related method. Since the video decoders have their own signals related to de-interlacing control actions (i.e., the first interlaced control signal $SC\_DI_1$) and these relevant signals are ensured absolutely correct, a risk of erroneous judgments by the de-interlacing circuit can be avoided if these relevant signals are directly sent to the 3:2/2:2 pull-down detector of the de-interlacing circuit by the video decoder. By collocating the mechanism disclosed in the present invention with the frame rate converting circuit as well as the follow-up timing control circuit, the aforementioned problem that the frames outputted by the 3:2/2:2 pull-down detector move around or unsmooth can be solved. Therefore, image display performance can be further improved. Moreover, the mechanism disclosed in the present invention can be easily implemented without an additional cost, and the image display performance can be significantly improved, which is suitable for various kinds of applications.

Those skilled in the art will readily observe that numerous modifications and alterations of the device and method may be made while retaining the teachings of the invention.

What is claimed is:

1. A video processing apparatus for de-interlacing, comprising:
   a video decoder, for decoding a video data stream to generate an interlaced video signal and for transmitting a first interlaced control signal; and
   a de-interlacing circuit, coupled to the video decoder, the de-interlacing circuit comprising:
      a detecting unit, for generating a second interlaced control signal according to the interlaced video signal as well as the first interlaced control signal; and
      an interlacing to progressive converting unit, coupled to the detecting unit, for receiving the interlaced video signal as well as the second interlaced control signal and for converting the interlaced video signal into a first progressive video signal; and
   a selecting unit, coupled to the detecting unit and the video decoder, for selecting one signal from the first interlaced control signal and the second interlaced control signal as a third interlaced control signal; and
   a frame rate converting circuit, coupled to the de-interlacing circuit and the selecting unit, for adjusting a frame rate of the first progressive video signal to generate a second progressive video signal according to the third interlaced control signal.

2. The video processing apparatus of claim 1, wherein the interlaced video signal comprises interlaced scanning frames with 48 Hz, 60 Hz or 72 Hz.

3. The video processing apparatus of claim 1, wherein the detecting unit is a 3:2 pull-down detector or a 2:2 pull-down detector.

4. The video processing apparatus of claim 1, wherein the video decoder is a MPEG decoder.

5. A video processing method for de-interlacing, comprising:
   decoding a video data stream to generate an interlaced video signal;
   transmitting a first interlaced control signal;
   generating a second interlaced control signal according to the interlaced video signal as well as the first interlaced control signal;
   receiving the interlaced video signal as well as the second interlaced control signal, and converting the interlaced video signal into a first progressive video signal;
   selecting one signal from the first interlaced control signal and the second interlaced control signal as a third interlaced control signal; and
   adjusting a frame rate of the first progressive video signal to generate a second progressive video signal according to the third interlaced control signal.

6. The method of claim 5, wherein the interlaced video signal comprises interlaced scanning frames with 48 Hz, 60 Hz or 72 Hz.

* * * * *